United States Patent [19]
Benn et al.

[11] Patent Number: 5,696,351
[45] Date of Patent: Dec. 9, 1997

[54] CABLE RETENTION AND SEALING DEVICE

[75] Inventors: Alexander Benn, Stuttgart; Peter Henderson, Todenfeld; Detlev A. Lohmuller, Bonn, all of Germany; Paulmer M. Soderberg, Palo Alto, Calif.; Marc F. Moisson, Los Altos, Calif.; Lowell L Koht, Foster City, Calif.

[73] Assignee: Ericsson Raynet, Menlo Park, Calif.

[21] Appl. No.: 401,527

[22] Filed: Mar. 10, 1995

[51] Int. Cl.$^6$ .................... H02G 15/02; H02G 15/08
[52] U.S. Cl. .................... 174/92; 174/138 F; 174/77 R
[58] Field of Search .................... 174/91, 92, 93, 174/77 R, 74 A, 87, 138 F; 439/367, 465, 687

[56] References Cited

U.S. PATENT DOCUMENTS

| | | | |
|---|---|---|---|
| 3,183,302 | 5/1965 | Wochner et al. | 174/138 F X |
| 3,325,591 | 6/1967 | Wahl | 174/138 F X |
| 3,576,937 | 5/1971 | Eldridge, Jr. | 174/92 |
| 3,984,623 | 10/1976 | Worden | 174/138 F |
| 4,029,896 | 6/1977 | Skinner | 174/138 F X |
| 4,548,465 | 10/1985 | White | 350/96.2 |
| 4,624,519 | 11/1986 | Lawrence | 339/97 P |
| 4,692,564 | 9/1987 | Campbell et al. | 174/92 |
| 4,751,350 | 6/1988 | Eaton | 174/87 |
| 4,761,051 | 8/1988 | Crespo Ruiz et al. | 350/96.2 |
| 4,914,261 | 4/1990 | Tokumaru et al. | 174/92 |
| 4,924,034 | 5/1990 | Truesdale et al. | 174/87 |
| 4,963,698 | 10/1990 | Chang et al. | 174/77 R |
| 5,069,516 | 12/1991 | Koht et al. | 350/96.1 |
| 5,074,639 | 12/1991 | Smith | 385/100 |
| 5,113,038 | 5/1992 | Dehling | 174/92 |
| 5,280,556 | 1/1994 | Jones | 385/139 |
| 5,373,277 | 12/1994 | Naito | 336/92 X |
| 5,397,859 | 3/1995 | Robertson et al. | 174/92 |
| 5,451,717 | 9/1995 | Itou | 174/77 R |

FOREIGN PATENT DOCUMENTS

| | | |
|---|---|---|
| 9005401 | 5/1990 | WIPO . |
| 9315346 | 8/1993 | WIPO . |
| 9503560 | 2/1995 | WIPO . |

*Primary Examiner*—Hyung S. Sough
*Assistant Examiner*—Chau N. Nguyen
*Attorney, Agent, or Firm*—Lyon & Lyon LLP

[57] ABSTRACT

An intregal cable retention and sealing apparatus has reusable clamping mechanisms for the entry and exit of a wide variety of cable types and sizes to a sealed enclosure. The device is formed by "mirror-image" body halves having, when assembled, at least one axial passageway formed therethrough to accomodate one or more respective cables. One end of the apparatus includes a chamber for housing a sealing medium, whereas the other end includes a cable retention mechanism.

17 Claims, 3 Drawing Sheets

5,696,351

CABLE RETENTION AND SEALING DEVICE

BACKGROUND OF THE INVENTION

1. Field of the Invention

This invention pertains to the field of retaining cables within a sealed enclosure.

2. Prior Art Systems and Methods

In conventional communication networks, such as telecommunications or cable television distribution networks, it is often necessary to securably mount one or more transmission cables within an environmentally sealed enclosure in order to protect cable connection or splice locations from contamination due to environmental elements such as dust or moisture particles. Often, various electrical circuit components are located within the same enclosure, thereby requiring that the enclosed cables be arranged in an accommodating spacial configuration. Typically, the enclosure is provided with a removable cover or "door", which allows technicians to access the interior of the enclosure in order to repair or replace the components stored therein and/or perform cable splicing or related activities.

Typical enclosures are provided with one or more access ports to accommodate the placement (or removal) of various transmission cables. These access ports are typically configured as "slots", each sized to accommodate one or more cables, formed within a wall end portion of the enclosure, e.g., in the "top" or "bottom" of the enclosure. The slots are generally three-sided, with the open side facing the enclosure door. In this manner, the cables may be inserted into (or removed from) the access port slots when the enclosure door is open, but are retained within the enclosure while the door is closed.

The remaining "open area" of the cable access port, (i.e., between the outer cable sheath and the inner access port surface), must be properly sealed in order to prevent environmental contaminants from entering the enclosure once the cable is in place and the door is resealed. The sealing means must be substantially air and water tight and be capable of sufficiently sealing all remaining gaps in the cable access ports, while still allowing for cables to be easily inserted into, and removed out of the ports, respectively, preferably without requiring special tools or causing damage to the cable. It is known to use a mineral or silicon oil based gel packed in a cavity of a "seal block" to provide seals when a cable is inserted therethrough, the seal being effected by the compressive force of the cable against the packed gel within the seal block, with the seal block shaped to fit snugly within an access port of an enclosure, i.e., in a "tongue-in-groove" or "slotted" manner.

Once placed in an enclosure, it is often necessary to prevent the longitudinal movement of the cables in at least in one direction in order to prevent damage caused by inadvertent pulling on the cable. While movement in both directions is to be prevented in some cases, often it is desirable to allow movement only in one direction in order to allow more of the cable to be "pulled" into position, once placed within the enclosure. Moreover, while the cable placements within a sealed enclosure are sometimes intended to be permanent, it is frequently required that the cables be removable, or exchangeable, without disruption of the remaining elements in the enclosure. Several known mechanical retaining mechanisms are used to retain cables, such as pressure clamps, slotted wedges, and the like. As such, it is desirable that the selected sealing and retaining mechanisms accommodate the easy exchange of cables in and out of the enclosure. In order to prevent waste, it is also desirable that the sealing and retaining mechanisms be reusable for each new cable placement.

In typical communication networks, the types and sizes of transmission "cables" may vary greatly, e.g., from wide range of gages of copper wires, to optical carrier cables containing a plurality of glass-like optical fibers within a single outer sleeve, or "jacket" It is often necessary, therefore, to secure multiple cables of varying types and sizes within a single sealed enclosure, including cables having varying jacket compositions and strengths. Importantly, each cable type and size may have unique handling requirements, e.g., such as differing strengths, and each must be properly handled to avoid damage to the cable, e.g., from being crushed, sheared, or kinked, because of excessive compressive or tensile forces.

Thus, it is desirable to be able to insert, store and exchange varying types and sizes of cables within an enclosure, while utilizing the same sealing and retention mechanisms.

SUMMARY OF THE INVENTION

The present invention is an integral cable retention and sealing apparatus comprising reusable clamping mechanisms for the entry and exit of a wide variety of cable types and sizes to a sealed enclosure. In preferred embodiments, the device is formed by "mirror-image" body halves having, when assembled, at least one axial passageway formed therethrough to accommodate one or more respective cables. One end of the apparatus comprises a chamber for housing a sealing medium, whereas the other end comprises a cable retention mechanism.

Thus, it is an object of the invention to provide an combined cable retention and sealing device for securing cables within a environmentally sealed enclosure. As will be apparent to those skilled in the art, other and further objects and advantages will appear hereinafter.

BRIEF DESCRIPTION OF THE DRAWINGS

It is to be understood that the accompanying drawings are provided for the purpose of illustration only, and are not intended as a definition of the limits of the invention. The drawings illustrate both the design and utility of preferred embodiments of the present invention, in which.

DETAILED DESCRIPTION OF THE PREFERRED EMBODIMENTS

Figure 1:
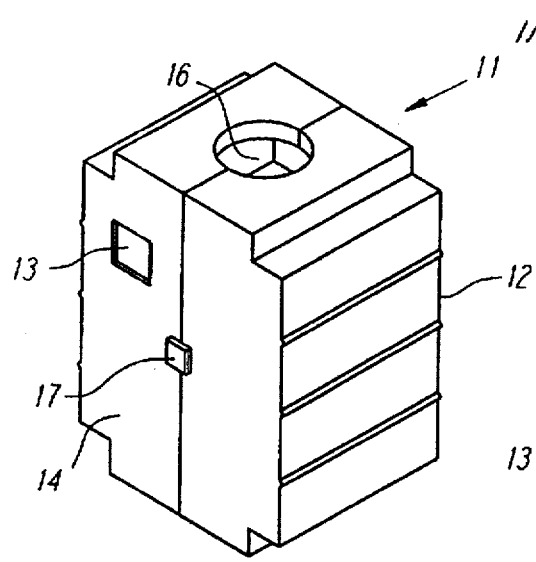
FIG. 1 is a perspective view of a preferred embodiment of a cable retention and sealing device, according to the invention.
Figure 2:
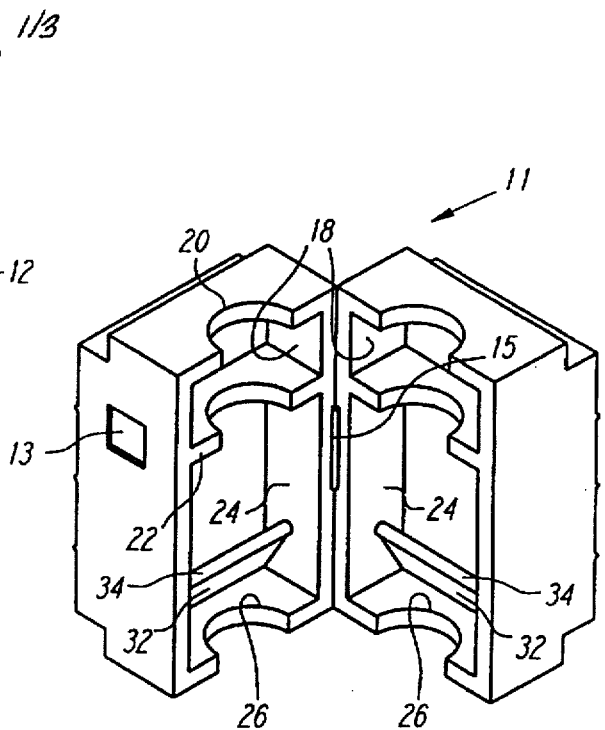
FIG. 2 is a perspective view of the device, opened at the hinge.

As seen in FIGS. 1 and 2, a cable retention and sealing device 11 is formed by two substantially mirror-image body halves 12 and 14, respectively, attached by a hinge 15. When attached, body halves 12 and 14 form a pair of internal chambers 18 and 24, respectively, wherein a first "sealing" chamber 18 is formed between an upper housing wall 20 and an internal dividing wall 22, and a second "retaining" chamber 24 is formed between dividing wall 22 and a bottom surface 26, respectively. An axial passage way 16 is formed by matching semi-circular "cut-away" portions in walls 20, 22 and 26, respectively, to allow the placement of a communication cable through the middle of the device 11. A latch 17, such as a pressure clamp or the like, is provided to securely attach body halves 12 and 14. A labelling location 13 is provided to track which cable(s), if any, are enclosed within the device 11. In the embodiment illustrated in FIG. 2, a unidirectional cable locking mechanism is provided by a pair of resilient retaining tabs 32, which extend from the interior walls of chamber 24 into the axial passageway 16. By use of triangular-shaped ends 34 on each of the retaining tabs 32, a cable placed through the axial passageway 16 will be prevented from longitudinal movement in the direction towards wall 26, while being allowed to pass freely in the direction towards wall 20. (Best seen in FIG. 4).

Figure 3:
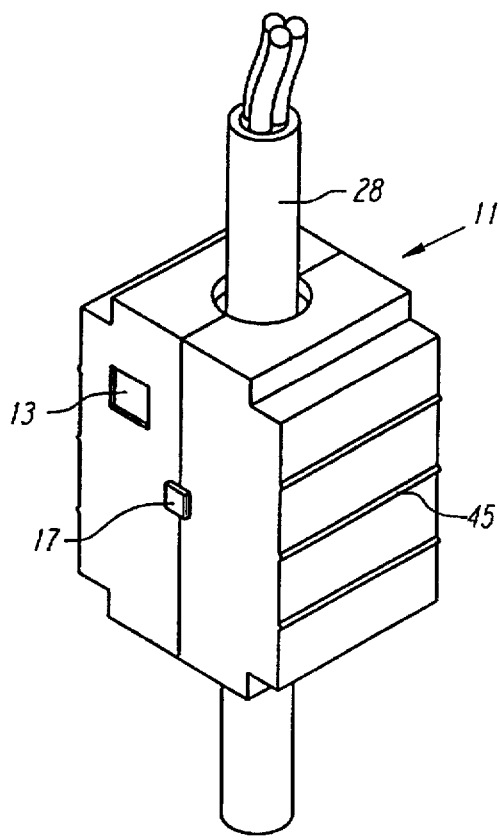
FIG. 3 is a perspective view of the device attached around a communications cable.
Figure 4:
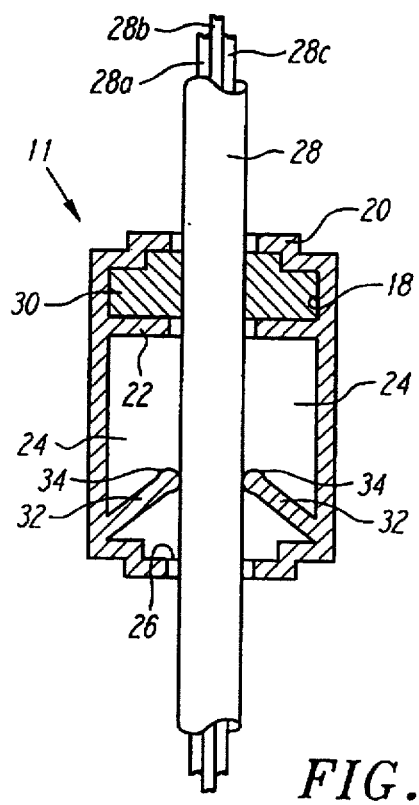
FIG. 4 is a cross-section taken along lines A—A of FIG. 3.

Referring to FIGS. 3 and 4, the device is depicted as attached around a communication cable intended for placement within a sealed enclosure, such as described in U.S. patent application Ser. No. 08/401,529, filed Mar. 10, 1995, and which is incorporated herein by reference herein. In the illustrated embodiment, a cable sheath 28 is securely fastened within the cable retention sealing device 11, the sheath containing a plurality of various communication cables and/or wires 28a, 28b, 28c. As can be seen in FIG. 4, a sealing medium 30, such as a mineral or silicon oil based gel, is provided in sealing chamber 18. Preferably there is sufficient sealant 30 in chamber 18 so that when the cable 28 is placed within the device 11, the displacement by the cable 28 of the area within the chamber 18 will result in a compressive force exerted by the sealant 30 upon the cable 28, thereby preventing any environmental contamination, e.g., such as dust or moisture particles, from entering through chamber 18 into chamber 24 or beyond.

Figure 5:
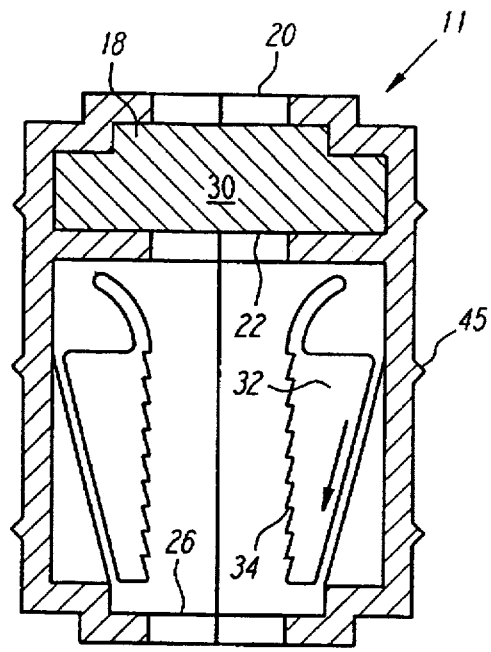
FIGS. 5–8 are cross-sections of the device, illustrating various alternative unidirectional locking mechanisms as the cable retention means.
Figure 6:
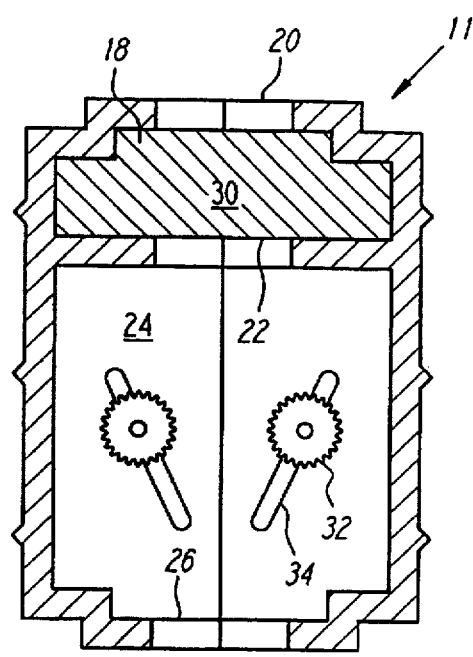
Figure 7:
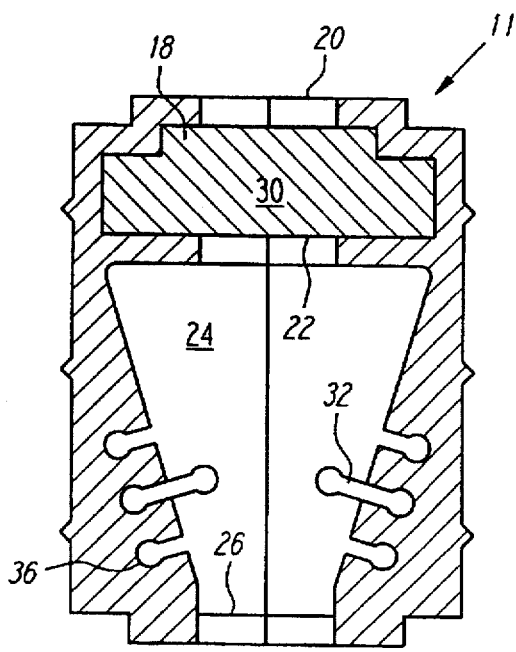
Figure 8:
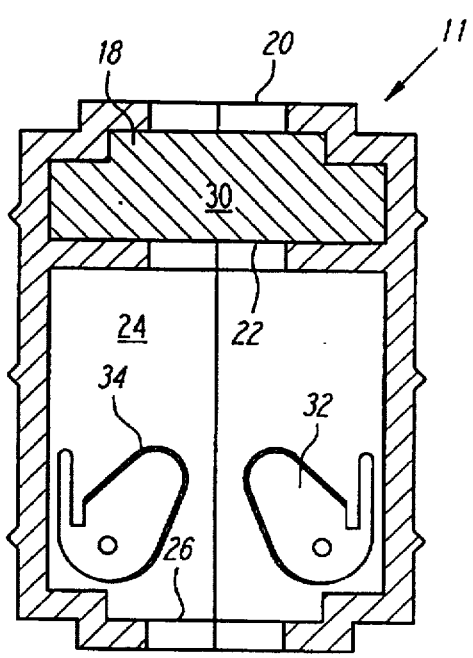

FIGS. 5 through 8 illustrated various unidirectional locking, or "engaging" mechanisms employed as cable retention means in retaining chamber 24. In particular, FIG. 5 depicts the use of a "saw-toothed" compression clamping jaws; FIG. 6 depicts a converging "slot and toothed-gear" mechanism; FIG. 7 depicts a variable diameter resilient retaining tab configuration, including a plurality of holding slots 36, and FIG. 8 depicts a pair of locking cams. These mechanisms are intended to be exemplary of just some of the many possible retaining mechanisms that will work in the device and are not in any manner intended to be limiting.

Figure 9:
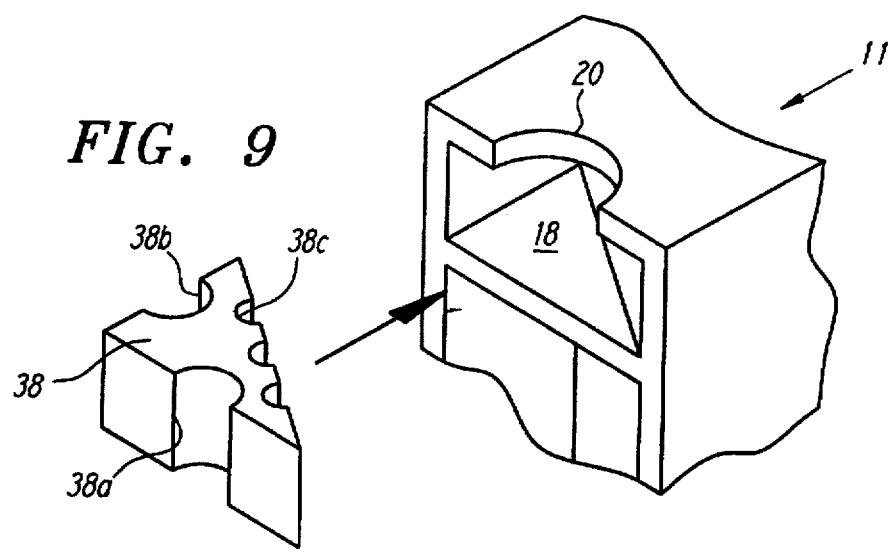
FIG. 9 is a perspective view of a gell block for use as the sealing means.

As seen in FIG. 9 an alternate embodiment may use a sealing gel block as the sealing means in sealing chamber 18. The illustrated gel block provides an interchangeable cable seal collar, including a "large" collar 38a, a "medium" collar 38b, and a plurality of "small" collars 38c, respectively.

Figure 10:
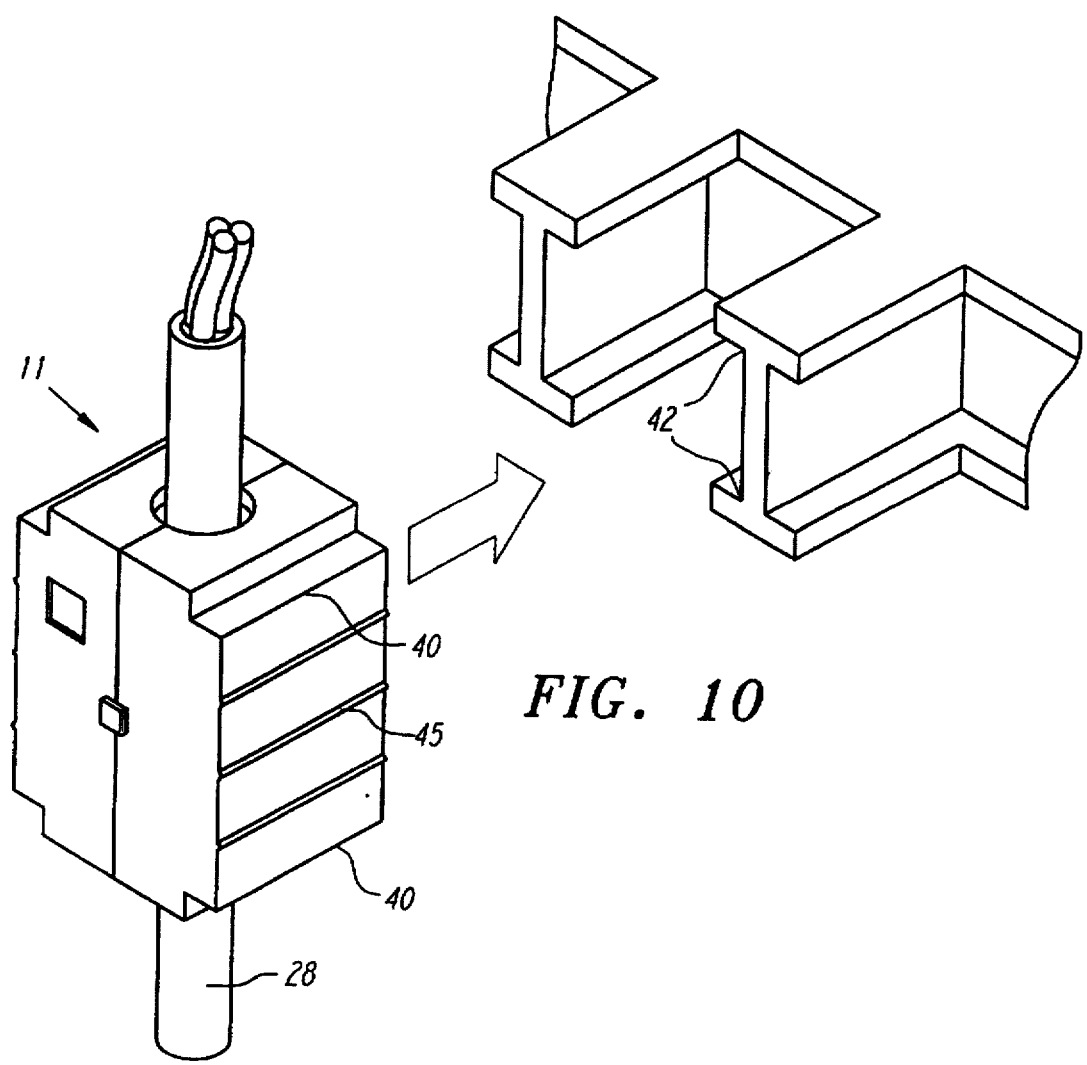
FIG. 10 is a perspective illustration of the device attached around a cable as it is inserted into a cable access slot of a sealed enclosure.

FIG. 10 illustrates the cable retention and sealing device 11 as it is about to be inserted, along with an enclosed cable 28 into a cable access slot 42 of a sealed enclosure (Not Shown). The device 11 is formed with bevelled edges 40 to accommodate a slidable, interlocking fit in slot 42, i.e., in a "tongue and groove" manner. A plurality of sealing ridges 45 are formed on the outer surface of the device 11 to prevent leakage of environmental contaminants between the internal walls of slot 42 and the outer surface of device 11. (See also FIG. 5).

Thus, a an integral cable retention and sealing apparatus has been disclosed. While embodiments and applications of the present invention have been illustrated and described, it would be apparent to those skilled in the art that many other modifications are possible without departing from the inventive concepts herein. By way of example, alternate variations of the inventive concept of providing co-located, modular cable retention and sealing apparatus are also possible. Other preferred embodiments having multiple cable configurations or having a second retention chamber to restrict movement of the cable in both directions are also envisioned. By way of further example, not intended to be limiting, a three-chamber configuration such as one having a retaining chamber or "tensioner" in the outer ends and the seal in the middle chamber, or having a tensioner in the middle chamber (uni- or bi-directional) with sealing chambers at both ends for double security must be considered, are also contemplated within the invention.

The scope of the invention, therefore, is not to be restricted except in the spirit of the appended claims.

We claim:

1. A cable retention and sealing apparatus, comprising:

a pair of body halves attached to each other and forming an axial passageway; a first chamber housing a sealing medium, and a second chamber housing a cable retention mechanism;

the body halves having means for providing a slidable interlocking fit in a cable access slot of a sealed enclosure, and forming an upper housing wall and an internal dividing wall, with the first chamber formed therebetween.

2. The cable retention and sealing apparatus of claim 1, the body halves further forming a lower housing wall, the second chamber formed between the internal dividing wall and the lower housing wall.

3. The cable retention and sealing apparatus of claim 2, said axial passageway formed by matching semi-circular cut-away portions located in said upper housing wall, said internal dividing wall and said lower housing wall, respectively, of said body halves.

4. The cable retention and sealing apparatus of claim 1, said cable retention mechanism comprising a pair of resilient retaining tabs which extend into said axial passageway.

5. The cable retention and sealing apparatus of claim 1, said body halves affixed by at least one hinge.

6. The apparatus of claim 1 further comprising a plurality of sealing ridges formed on an outside surface of the body halves.

7. The cable retention and sealing apparatus of claim 1, wherein the body halves are attached by a latch.

8. A cable retention and sealing apparatus, comprising:

a pair of body halves attached to each other and forming an axial passageway, a first chamber housing a sealing medium, and a second chamber housing a cable retention mechanism;

the body halves having means for providing a slidable interlocking fit in a cable access slot of a sealed enclosure;

the body halves forming an upper housing wall, an internal dividing wall and a lower housing wall, wherein the first chamber is formed between the upper housing wall and the internal dividing wall, and the second chamber is formed between the internal dividing wall and the lower housing wall.

9. The cable retention and sealing apparatus of claim 8, wherein the axial passageway is formed by matching semi-circular cut-away portions located in the upper housing wall, the internal dividing wall and the lower housing wall, respectively, of the body halves.

10. The cable retention and sealing apparatus of claim 8, wherein the cable retention mechanism comprises a pair of resilient retaining tabs which extend into the axial passageway.

11. The cable retention and sealing apparatus of claim 8, wherein the body halves are affixed by at least one hinge.

12. The cable retention and sealing apparatus of claim 8, further comprising a plurality of sealing ridges formed on an outside surface of the body halves.

13. The cable retention and sealing apparatus of claim 8, wherein the body halves are attached by a latch.

14. A cable retention and sealing apparatus, comprising:
   a pair of body halves attached to each other and forming an axial passageway, a first chamber housing a sealing medium, and a second chamber housing a cable retention mechanism;
   the body halves having means for providing a slidable interlocking fit in a cable access slot of a sealed enclosure; and
   a plurality of sealing ridges formed on an outside surface of the body halves.

15. The cable retention and sealing apparatus of claim 14, wherein the cable retention mechanism comprises a pair of resilient retaining tabs which extend into the axial passageway.

16. The cable retention and sealing apparatus of claim 14, wherein the body halves are affixed by at least one hinge.

17. The cable retention and sealing apparatus of claim 14, wherein the body halves are attached by a latch.

* * * * *